United States Patent Office 3,353,891
Patented Nov. 21, 1967

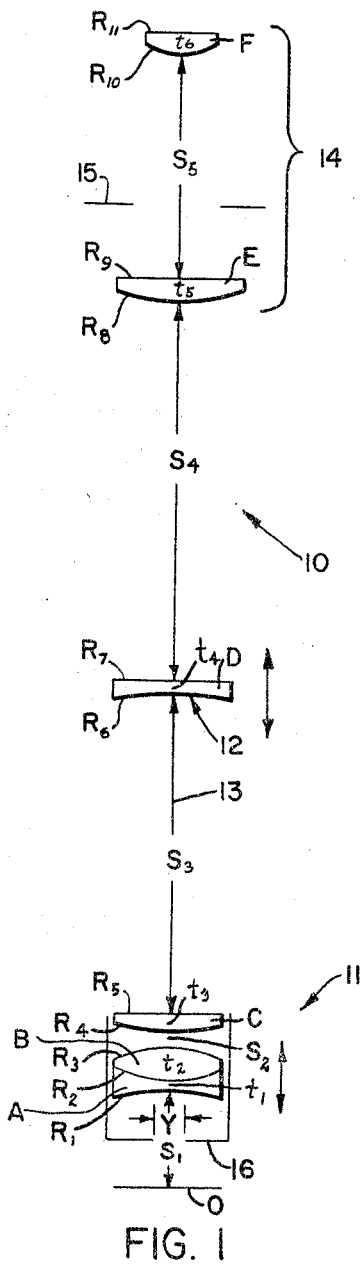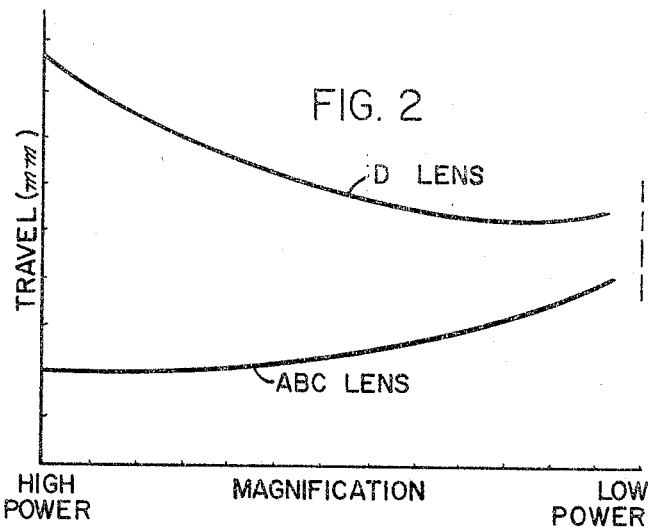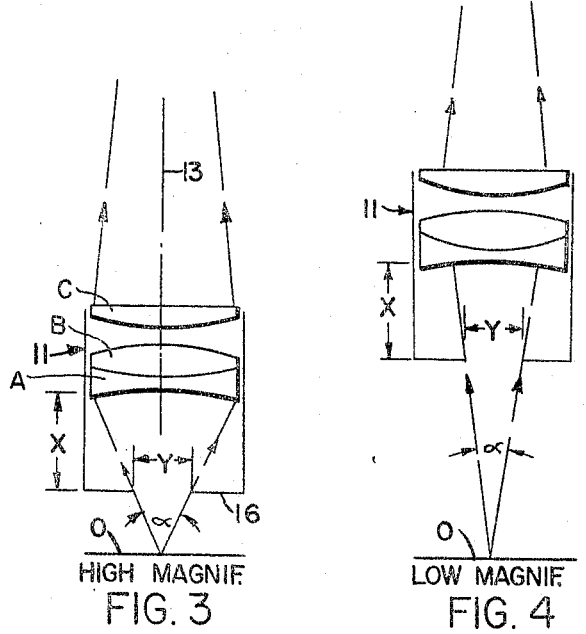

---

3,353,891
ZOOM LENS SYSTEM HAVING FRONT MOUNTED AXIALLY MOVABLE APERTURE STOP TO CONTROL NUMERICAL APERTURE DURING MAGNIFICATION CHANGE
Harold E. Rosenberger, Brighton, N.Y., assignor to Bausch & Lomb Incorporated, Rochester, N.Y., a corporation of New York
Filed June 18, 1964, Ser. No. 376,009
7 Claims. (Cl. 350—17)

ABSTRACT OF THE DISCLOSURE

A zoom lens system for a microscope, said system being characterized by two movable lens members, one member being the objective of the instrument having a front aperture plate attached thereto, the other member being a negative corrector lens, the relative axial motions of said members causing the numerical aperture of the system on the object side to vary linearly with magnification of the image.

---

Cross reference to related applications

The present application is a continuation-in-part of my copending application Serial No. 222,494, filed September 10, 1962, now abandoned.

The present invention relates to a pancratic optical system for microscopes and it relates more particularly to a zoom or continuously variable focus type of pancratic system.

Microscope optical systems of the general type which is under consideration hereinafter are shown in U.S. Patent No. 2,997,919 issued to W. G. Peck on August 29, 1961. In this type of zoom optical system, the objective in reality is comprised of a movable positive lens group and a rearwardly spaced compensating movable negative lens group which cooperatively produce a stationary image of continuously variable magnification in a microprojector.

In designing an optical system of the aforesaid type for an ordinary microscope, it is decidedly advantageous to improve the system in such a manner that the numerical aperture on the object side thereof varies substantially linearly with magnification while the numerical aperture on the image side remains constant whereby the intensity of the illumination as seen in the eyepiece of the instrument remains the same throughout all variations of magnification of the image.

It is therefore an object of the present invention to provide a zoom type of pancratic optical system for microscopes having a magnification range of at least 4:1 and wherein the intensity of illumination of the image seen in the eyepiece of the instrument remains even and constant throughout all variations of the magnification thereof.

It is a further object of this invention to provide a novel optical system of the aforesaid kind wherein the construction is simple and economical but wherein all of the necessary optical parameters are so chosen as to produce a system in which the monochromatic as well as the chromatic image aberrations are well corrected along with distortion and field curvature.

It is a still further object to provide such a device wherein the numerical aperture of the optical system corresponds to a comparatively wide angle and the numerical aperture value varies substantially linearly with change of magnification on the object side during all changes of magnification of the image whereby a substantially constant numerical aperture is achieved on the image side thereof.

Another object is to provide such a device having certain optical parts so designed as to contribute particularly to a superior correction of the spherical and chromatic aberrations in the optical system.

Further objects and advantages will be apparent in the details of construction and arrangement of the parts from a study of the specification herebelow, taken in conjunction with the accompanying drawings, wherein:

FIG. 1 is an optical diagram of one form of a zoom type of pancratic optical system for a microscope constructed according to the present invention;

FIG. 2 is a chart showing the relative motions of the movable parts of the objective portion of the optical system;

FIG. 3 is a schematic optical diagram illustrative of one feature of this invention;

FIG. 4 is a diagram similar to FIG. 3 showing the elements thereof in an alternative operative position.

Figure 5:
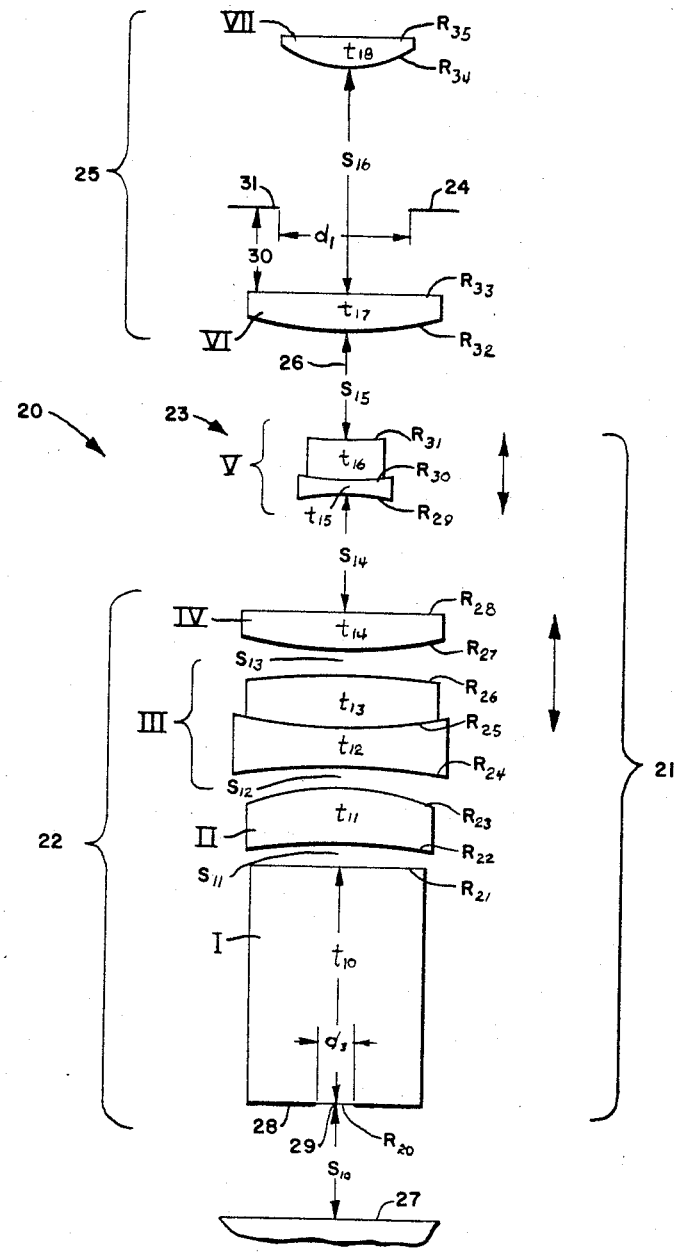
FIG. 5 is an optical diagram showing another form of the present invention.

As aforesaid, the present optical system concerns the improvement of zoom optical systems of comparatively simple form and in all forms of the present invention the objective includes a movable positive lens group and a movable negative lens group, both of which are movable axially in such a manner as to form a stationary image of variable magnification within a magnification range of substantially 4.0 rearwardly along the optical axis. Secondly, all of said positive lens groups have substantially the same numerical value of equivalent focal length, and all of said negative lens groups have substantially the same numerical value of equivalent focal length so that the image magnification produced by each zoom system per se is the same in all cases and advantageously the same actuating cam structure can be used for operating each form of the zoom system. In optical terms, the first order design of the several forms of zoom systems is substantially the same, so that like movable parts of the zoom systems are moved in the same manner to produce the change of image magnification.

In all forms of the invention, the equivalent focal length of the front positive lens group is designated F and that of the rear lens group is designated −F'; the relative values thereof being stated herebelow, $$1.348\ F < -F' < 1.647\ F$$

Ideally, the value should be $-F' = 1.497\ F$.

The differences in the two forms of zoom optical systems here shown and described is brought about by efforts to provide different degrees of correction for third and higher order aberrations, and by efforts to provide various manufacturing economies and simplicity of structure.

For purposes of this invention, it is the detailed similarities in structure of the plural forms of the invention which are pointed out herebelow. Such similar structure in addition to the features above mentioned include:

(1) An aperture plate located ahead of the front lens of the positive lens group and serving as the aperture stop of the optical system.

(2) A positive lens group including a positive doublet lens, and a positive singlet lens spaced next rearwardly therefrom, said doublet lens comprising a front double concave element and a rear double convex element cemented thereto.

(3) The values for the lens surface radii of the successive surfaces of said doublet and singlet lenses being within the range stated herebelow:

Radius of front surface, doublet lens=−2.30 F to −580 F
Radius of interface, doublet lens=0.95 F to 1.30 F
Radius of rear surface, doublet lens=−0.60 F to −1.30 F
Radius of front surface, singlet lens=1.00 F to 1.50 F
Radius of rear surface, singlet lens>±2.0 F.

In the form of the invention shown in FIG. 1, said optical system is designated generally by numeral 10 and comprises primarily an objective having two movable parts designated respectively 11 for the front positive part nearest to the object 0 and 12 for the rear negative part which are aligned on the optical axis 13 of the instrument, said optical system further comprising an eyepiece member 14 for viewing the image formed by the objective. The movable members 11 and 12 of the objective together form a real image of the object 0 and are simultaneously moved relative to each other along said optical axis in such a manner that said image is formed at a stationary position in the eyepiece diaphragm 15, said image varying in size through a magnification range of at least 4:1.

One of the features of this invention is the provision of an aperture diaphragm 16 at a fixed distance ahead of the front member 11 for controlling the numerical aperture of the optical system throughout all of its operative positions. The aperture diaphragm 16 together with other optical parameters of the optical system 10 causes the numerical aperture on the object side of the optical system to vary substantially directly linearly with magnification while the numerical aperture on the image side remains constant. This feature is more explicitly set forth hereinafter.

In the mechanism of this invention the front lens member 11 of the objective consists of a front doublet lens designated AB and a singlet lens C spaced rearwardly therefrom at a constant distance $S_2$. The compound lens AB and the singlet lens C are united operatively with the aperture diaphragm mechanism 16 so that together they constitute one movable operative unit or part. Spaced rearwardly from the front objective member AB and singlet lens C is the movable member 12 in the form of a singlet dispersive lens D which together with the front member forms a real image in the eyepiece diaphragm 15.

By reference to FIG. 2, it will be seen that the front lens assembly 11 moves toward the rear movable lens member D as the magnification of the system progresses from high to low magnification. During this motion the numerical aperture on the object side varies substantially linearly with magnification as aforesaid. The last-named feature is adequately illustrated in the optical diagrams of FIG. 3 and FIG. 4 wherein the aperture diaphragm 16 is situated at a constant distance represented by quantity X in FIG. 3, the diameter Y of the aperture being the same and constant at all magnifications of the image. The value of X lies between 0.585 F and 0.715 F and the value of Y equals substantially 0.104 F. It is readily apparent from FIGS. 3 and 4 that the included angle which is designated α between the divergent rays as limited by the edge of the diaphragm varies as above pointed out, FIGS. 3 and 4 representing the condition for high and low magnification respectively.

As aforesaid, during said changes of magnification, said image remains stationary at the diaphragm 15 and the numerical aperture on the image side of the objective 10 remains at a substantially constant value which results in the advantage that the image seen in the eyepiece always remains at constant brightness or intensity.

For the purpose of the correction of lateral chromatism introduced by lens members 11 and 12 into the optical system 10, the constructional data for the eyepiece 14 is so chosen as to effect a substantially complete correction for said lateral chromatism. Accordingly, the eyepiece 14 is not considered to be separate or separable from the objective portion of the optical system and constitutes an important part of the aberration correction mechanism. Said eyepiece parameters are set forth hereinafter. A further benefit of such eyepiece construction data resides in the comparatively long eye relief which is provided for the instrument.

With respect to the parameters of the optical system 10, the positive doublet AB and positive singlet C of the objective 11 have respective focal lengths which are designated $F_{AB}$ and $F_C$, the range of values of which are given in the mathematical statements herebelow in terms of F as above defined.

$$2.573\ F < +F_{AB} < 3.144\ F\ (AB\ Lens)$$
$$1.448\ F < +F_C < 1.770\ F\ (C\ Lens)$$

As mentioned heretofore, the corresponding equivalent focal length of the rear lens member D has a negative value −F′ which is specified by the mathematical expression given herebelow, $$1.348\ F < -F' < 1.647\ F$$

Having the above-specified distribution of powers in the respective front and rear members of the optical system, a real image is formed as aforesaid at the eyepiece diaphragm 15, said image being stationary and varying in magnification when the members are moved in a specified manner as shown in FIG. 2 of the drawing through a magnification range of at least 4:1.

Further with respect to said parameters of the optical system, the focal lengths $F_E$ and $F_F$ related to eyepiece lenses E and F respectively are given in the mathematical statements of inequality as stated herebelow, $$2.386\ F < F_E < 2.917\ F$$
$$1.424\ F < F_F < 1.740\ F$$

During the changes in magnification for a magnification range of 4:1, the variable air spaces which are consecutively designated $S_1$, $S_3$ and $S_4$, in order from the object 0, are designated in the chart given herebelow wherein said air space values are given for a plurality of intermediate magnifications between the extremes thereof in conformity to FIG. 2.

ZOOM OPTICAL SYSTEM MAGNIFICATION RANGE=4:1

| Magnification | Space $S_1$ | Space $S_3$ | Space $S_4$ |
|---|---|---|---|
| 25.00× | 2.214 F | 0.437 F | 5.847 F |
| 31.25× | 1.942 F | 0.598 F | 5.960 F |
| 37.50× | 1.750 F | 0.765 F | 5.983 F |
| 43.75× | 1.608 F | 0.943 F | 5.948 F |
| 50.00× | 1.498 F | 1.128 F | 5.870 F |
| 56.25× | 1.410 F | 1.326 F | 5.763 F |
| 62.50× | 1.338 F | 1.535 F | 5.625 F |
| 68.75× | 1.277 F | 1.758 F | 5.464 F |
| 75.00× | 1.223 F | 1.998 F | 5.275 F |
| 81.25× | 1.179 F | 2.256 F | 5.002 F |
| 87.50× | 1.138 F | 2.547 F | 4.812 F |
| 93.75× | 1.102 F | 2.876 F | 4.520 F |
| 100.00× | 1.067 F | 3.267 F | 4.165 F |

Stated in another manner, the successive air spaces $S_1$, $S_3$ and $S_4$ are given by the table of statements of inequalities as set forth herebelow, For least magnification:
$1.993F < S_1 < 2.435F$
$0.393F < S_3 < 0.481F$
$5.262F < S_4 < 6.432F$ For highest magnification:
$0.960F < S_1 < 1.169F$
$2.940F < S_3 < 3.594F$
$3.748F < S_4 < 4.582F$ Air spaces $S_2$ and $S_5$ between the compound lens AB and singlet lens C, and between the E and F eyepiece lenses respectively have fixed values as specified in the following statement of inequalities, $$0.0100F < S_2 < 0.0122F$$
$$2.023F < S_5 < 2.471F$$

Ideally, the equivalent focal length $F_{AB}$ of the front doublet lens, and $F_C$ of the rear singlet lens in the front lens member should be 2.858F and 1.609F respectively. Likewise, the equivalent focal length of the rear lens member $-F'$ ideally should be substantially 1.497F.

Furthermore, the value of the focal length of the double concave lens element A should be substantially $-1.034F$, and the value of the focal length of the double convex element B should be substantially .815F.

In the eyepiece, the corresponding value of the axial distance between the rear surface $R_9$ of the eyepiece lens E and the eyepiece diaphragm 15 lies between 0.599F and 0.733F, and the diameter of diaphragm opening has a value which lies between .841F and 1.027F.

As the result of computation and experimentation in this development, the values for radii of curvature of the successive lens surfaces which are designated $R_1$ to $R_{11}$, and the values for the successive lens thicknesses $t_1$ to $t_6$, should lie within the ranges of the values as given in the table of mathematical statements given herebelow,

| | |
|---|---|
| $2.350F < -R_1 < 2.872F$ | $0.738F < R_{10} < 0.900F$ |
| $0.951F < R_2 < 1.165F$ | $R_{11} > \pm 10.000F$ |
| $0.601F < -R_3 < 0.735F$ | $0.0850F < t_1 < 0.1040F$ |
| $1.043F < R_4 < 1.275F$ | $0.1299F < t_2 < 0.1587F$ |
| $2.530F < -R_5 < 3.090F$ | $0.1299F < t_3 < 0.1587F$ |
| $0.697F < -R_6 < 0.851F$ | $0.0500F < t_4 < 0.0612F$ |
| $R_7 > \pm 10.000F$ | $0.2000F < t_5 < 0.2448F$ |
| $1.718F < R_8 < 2.100F$ | $0.1650F < t_6 < 0.2016F$ |
| $R_9 > \pm 10.000F$ | |

The minus (—) sign denotes lens surfaces which are concave with respect to entrant rays. The specific corresponding values which have been found to be especially effective in some forms of this invention are given in the table of values herebelow,

| | |
|---|---|
| $-R_1 = 2.611F$ | $R_{11} = $ Plano |
| $R_2 = 1.059F$ | $t_1 = 0.0945F$ |
| $-R_3 = 0.668F$ | $t_2 = 0.1445F$ |
| $R_4 = 1.161F$ | $t_3 = 0.1445F$ |
| $-R_5 = 2.811F$ | $t_4 = 0.0556F$ |
| $-R_6 = 0.774F$ | $t_5 = 0.2223F$ |
| $R_7 = $ Plano | $t_6 = 0.1834F$ |
| $R_8 = 1.909F$ | $S_2 = 0.0111F$ |
| $R_9 = $ Plano | $S_5 = 2.247F$ |
| $R_{10} = 0.818F$ | |

Furthermore, the range of absolute values for the refractive index $n_D$ and Abbe number $\nu$ which have been found to be most successful lie within the values as stated in the table of mathematical expressions given herebelow, $$1.700 < n_D \text{(Lens element A)} < 1.750$$
$$1.515 < n_D \text{(Lens element B)} < 1.520$$
$$1.515 < n_D \text{(Lens element C)} < 1.520$$
$$1.515 < n_D \text{(Lens element D)} < 1.520$$
$$1.700 < n_D \text{(Lens element E)} < 1.750$$
$$1.515 < n_D \text{(Lens element F)} < 1.520$$
$$25.0 < \nu \text{(Lens element A)} < 34.0$$
$$60.0 < \nu \text{(Lens element B)} < 70.0$$
$$60.0 < \nu \text{(Lens element C)} < 70.0$$
$$60.0 < \nu \text{(Lens element D)} < 70.0$$
$$25.0 < \nu \text{(Lens element E)} < 34.0$$
$$60.0 < \nu \text{(Lens element F)} < 70.0$$

Specifically, one successful form of the optical system constructed according to this invention is given in the table herebelow wherein $R_1$ to $R_{11}$ represent the radii of the successive lens surfaces, and the minus (—) sign used therewith designates those surfaces which are concave with respect to the entrant rays, $t_1$ to $t_6$ represent the axial thicknesses of the successive lens elements, $S_1$ to $S_5$ represent the successive air spaces, and $n_D$ and $\nu$ represent respectively the refractive index and Abbe number of the optical materials from which the lens parts are made, and $F_{AB}$, $F_C$, $-F'$, $F_E$ and $F_F$ designate respectively the focal lengths of the lenses AB, C, D, E and F as heretofore and the letter $m$ designates the magnification of the image,

| Lens | Radii | Focal Lengths | Lens Thicknesses | Air Spaces | $n_D$ | $\nu$ |
|---|---|---|---|---|---|---|
| A | $-R_1 = 46.989$ | $F_{AB} = 51.438$ (Lens AB) | $t_1 = 1.70$ | $S_1 = \begin{cases} 39.840 \text{ at } 25\times \\ 19.194 \text{ at } 100\times \end{cases}$ | 1.720 | 29.3 |
| B | $R_2 = 19.055$ | | $t_2 = 2.60$ | | 1.517 | 64.5 |
| | $-R_3 = 12.023$ | | | $S_2 = 0.20$ | | |
| C | $R_4 = 20.893$ | $F_C = 28.958$ (Lens C) | $t_3 = 2.60$ | | 1.517 | 64.5 |
| | $-R_5 = 50.582$ | | | $S_3 = \begin{cases} 7.873 \text{ at } 25\times \\ 58.795 \text{ at } 100\times \end{cases}$ | | |
| D | $-R_6 = 13.932$ | $F' = -26.948$ (Lens D) | $t_4 = 1.00$ | | 1.517 | 64.5 |
| | $R_7 = $ Plano | | | $S_4 = \begin{cases} 106.810 \text{ at } 25\times \\ 76.535 \text{ at } 100\times \end{cases}$ | | |
| E | $R_8 = 34.356$ | $F_E = 47.717$ (Lens E) | $t_5 = 4.00$ | | 1.720 | 29.3 |
| | $R_9 = $ Plano | | | $S_5 = 40.432$ | | |
| F | $R_{10} = 14.723$ | $F_F = 28.478$ (Lens F) | $t_6 = 3.30$ | | 1.517 | 64.5 |
| | $R_{11} = $ Plano | | | | | |

All scalar quantities being given in millimeters.

The diaphragm 16 at the front of the optical system in the above example has a diameter Y of substantially 1.87 mm. and an axial separation X from lens AB of 11.7 mm.

The second form of the present invention is shown in FIG. 5 of the drawings and the specific magnification range of the final image produced by the optical system is designated as being 50× to 200×, which is twice the total magnification of 25× to 100× produced by the form of invention shown in FIG. 1.

In the second form of the invention as shown in FIG. 5, the numerical aperture is substantially twice that of the numerical aperture of the optical system shown in FIG. 1 and the construction is particularly designed to correct the larger image aberrations which ordinarily are produced in an optical system having the larger numerical aperture. The optical system shown in FIG. 5 is generally designated by numeral 20 and comprises an objective 21 which is composed of a front positive lens member or group 22 and a rear negative lens member or group 23 which cooperatively with a field lens VI of the eyepiece 25 forms an image in the image plane 24. Rearwardly of the objective 21 is provided an optically aligned eyepiece member 25 which is located on a common optical axis 26 with the objective 21. It will be understood that the positive lens group 22 and the negative lens group 23 are moved axially relative to each other and relative to a fixed point on the axis 26 in such a manner as to form a stationary image heretofore mentioned rearwardly adjacent to the plane 24 of an object surface 27.

The optical parameters of the entire optical system are so chosen and computed that the optical properties of the image are of excellent quality particularly with regard to spherical and chromatic aberrations, coma, astigmatism, and curvature of field throughout the entire range of zooming motion thereof. Furthermore, similarly to the first form of the invention shown in FIG. 1, the focal length F of the positive lens member 22 bears a numerical relationship to the negative focal length $-F'$ of the negative lens group 23 as stated in the mathematical expression $$1.348F < -F' < 1.647F$$

the ideal value being $-F' = 1.497 F$ or alternatively $F = $ substantially $-.668F'$.

Contributory to good imagery, the objective 21 comprises in its aforesaid positive member 22 a block of transparent optical material which is designated I, said block being located next to the object surface 27 and being spaced therefrom at a distance designated $S_{10}$.

The glass block I, located on the object side of the positive member 22, forms a part thereof and serves the important function of introducing spherical and axial chromatic aberration correction for the microscope optical system 20. The advantages to be derived from this method of aberration correction are:

(1) Less costly than the classical method of increasing the powers and curvatures of the doublet lens III or increasing the number of doublet lenses employed in the system.
(2) In the system described, reduced zonal spherical aberration through the introduction of nearly pure third order spherical aberration by the glass block as contrasted with third and higher order spherical aberration introduced by the doublet method of correction.

It is pointed out that use of the glass block proves to be an exceptionally powerful means of achieving a desirable balance between axial chromatic aberration and third order spherical aberration, for it can be shown that:

(1) Both axial chromatic and third order spherical aberration vary directly with block thickness;
(2) Within the range of refractive indices of ordinary optical glasses, third order spherical aberration is practically independent of refractive index, varying by only about four percent within the index range from 1.50 to 1.75;
(3) Chromatic abberation varies inversely with $\nu$ value;
(4) For a given $\nu$ value, chromatic aberration changes little with refraction index changes varying by only about ten percent over the index range from 1.50 to 1.75.

As a consequence of the above-described relationship and because of the wide assortment of available optical glasses, it becomes possible to achieve a desired third order spherical correction by the choice of block thickness and almost independently, achieve a desired axial chromatic correction by the choice of glass.

It is to be pointed out further that in a system of higher numerical aperture than that of the system described, the concept of the glass block may serve as an even more important means of balancing out third and *higher* order spherical aberration arising from subsequent lens surfaces with the third and higher order spherical aberration arising in a similar glass block located in a similar fashion between the object and lens system. Furthermore, advantages in the balancing of chromatic aberration and reduction in spheroachromatism can also be achieved through the careful selection of block thickness and the refractive index, as well as the $\nu$ value and partial dispersion of the material from which the block is made. It is also within the purview of the present invention that said block of glass may be fabricated from two or more plano-parallel components of different optical properties to provide even more extensive means of aberration control although no specific examples of this construction are set forth in detail.

Spaced rearwardly from the block I is a pair of positive singlet lenses which are spaced from each other and are designated II for the meniscus front lens and IV for the rear lens. Spaced intermediately between said lenses II and IV is a compound meniscus positive lens designated III which in common with lens II is concave toward the block I and is composed of a front double concave lens element which lies in contact with a double convex rear lens element.

Constituting the negative lens member is a compound lens designated V which is composed of a front double concave lens element which lies in contact with a rear positive meniscus lens element.

The image which is produced cooperatively by the above-described optical parts is formed rearwardly adjacent to the plane 24 as aforesaid. Rearwardly of the object surface 27 is provided an aperture plate 28 which is in contact with the front surface of the optical block I. Said aperture plate 28 is provided with an aperture 29 having a diameter of substantially .197 F where F represents the focal length of the positive lens member 22 per se and the aperture 29 is represented by $d_3$ in the drawing.

The provision of an aperture plate 28 in such a location results in said plate moving back and forth with the positive lens member 22 as a part thereof which causes the numerical aperture on the object side of the optical system to vary directly in proportion to changes in magnification over the magnification range of substantially 4 while the numerical aperture on the image side remains constant as aforesaid. The outstanding advantages of such a construction are that the image formed at the plane 24 is substantially constantly brightly illuminated throughout all changes of magnification, control of lens aberrations is thereby established, and the optimum objective numerical aperture for all magnification values throughout the microscope magnification range is thereby achieved.

For viewing the image formed by the objective 21, the aforesaid eyepiece member 25 is spaced rearwardly of the objective 21 and includes a front positive lens element designated VI which is situated at an axial distance 30 forwardly of the plane 24 and further includes another positive singlet lens designated VII which is spaced rearwardly from the plane 24. The eyepiece member 25 further includes a field diaphragm 31 located at the image plane 24 and having an aperture with the diameter designated $d_1$.

With respect to the constructional data used in specifying the above-described optical system, the focal lengths of the successive optical parts I–VII are given in the table of mathematical expressions herebelow, the successive focal lengths of said optical parts being respectively designated $F_I$ to $F_{VII}$.

$F_I = \infty$  
$1.815F < F_{II} < 2.219F$  
$5.765F < F_{III} < 7.046F$  
$2.216F < F_{IV} < 2.709F$  
$1.348F < F_V < 1.647F$  
$1.810F < F_{VI} < 2.213F$  
$0.720F < F_{VII} < 0.881F$ the value of F, as heretofore, representing the focal length of the positive lens member 22 of the objective 21 and also representing the focal length of objective lens 11 in FIG. 1.

The successive optical parts I–VII are formed with optical surfaces having designations $R_{20}$–$R_{35}$, these radii having values as set forth in the table of mathematical expressions herebelow, $R_{20} = $ Plano  
$R_{21} = $ Plano  
$10.841F < -R_{22} < 13.250F$  
$0.869F < -R_{23} < 1.062F$  
$5.001F < -R_{24} < 6.113F$  
$1.064F < R_{25} < 1.301F$  
$1.064F < -R_{26} < 1.301F$  
$1.146F < R_{27} < 1.400F$  
$R_{28} > \pm 10.0F$  
$1.007F < -R_{29} < 1.231F$  
$1.007F < R_{30} < 1.231F$  
$1.783F < R_{31} < 2.179F$  
$1.303F < R_{32} < 1.593F$  
$R_{33} = $ Plano  
$0.372F < R_{34} < 0.455F$  
$R_{35} = $ Plano Correspondingly, the values of the successive air spaces $S_{10}$–$S_{16}$ between the successive optical parts are given in the table of mathematical statements herebelow, wherein the values for the distances $S_{10}$, $S_{14}$ and $S_{15}$ are given for three typical positions in the zooming motion of the positive lens member 22 and the negative lens member 23, $m$ designating the magnification of said image.

$1.376F < S_{10} < 1.683F$ (least $m$)  
$0.732F < S_{10} < 0.895F$ (middle $m$)  
$0.344F < S_{10} < 0.421F$ (greatest $m$)  
$0.0400F < S_{11} < 0.0489F$  
$0.0050F < S_{12} < .0061F$  
$0.0050F < S_{13} < .0061F$  
$0.239F < S_{14} < 0.292F$ (least $m$)  
$0.862F < S_{14} < 1.053F$ (middle $m$)  
$2.786F < S_{14} < 3.405F$ (greatest $m$)  
$5.600F < S_{15} < 6.844F$ (least $m$)  
$5.624F < S_{15} < 6.874F$ (middle $m$)  
$4.096F < S_{15} < 5.006F$ (greatest $m$)  
$1.189F < S_{16} < 1.453F$ Furthermore, the values for the axial thicknesses which are designated $t_{10}$–$t_{18}$ for the successive lens elements and optical parts are given in the table of mathematical expressions herebelow, $0.750F < t_{10} < 0.917F$  
$0.200F < t_{11} < 0.245F$  
$0.100F < t_{12} < 0.122F$  
$0.185F < t_{13} < 0.226F$  
$0.125F < t_{14} < 0.153F$  
$0.040F < t_{15} < 0.049F$ (double concave element only)  
$0.125F < t_{16} < 0.153F$  
$0.100F < t_{17} < 0.122F$  
$0.110F < t_{18} < 0.134F$ More specifically, the constructional data for the form of the invention shown in FIG. 5 are stated herebelow, wherein the designations $F_I$–$F_{VIII}$ have the same meaning as heretofore, the minus (—) sign used with $F_V$ meaning negative focal length, $S_{10}$–$S_{16}$ and $t_{10}$–$t_{18}$, $R_{20}$–$R_{35}$ also having the same designations as mentioned above.

$F_I = \infty$  
$F_{II} = 2.017$ F  
$F_{III} = 6.406$ F  
$F_{IV} = 2.462$ F  
$-F_V = 1.498$ F  
$F_{VI} = 2.011$ F  
$F_{VII} = 0.800$ F  
$S_{10} = 1.530$ F (least $m$)  
$S_{10} = 0.814$ F (middle $m$)  
$S_{10} = 0.382$ F (greatest $m$)  
$S_{11} = 0.044$ F  
$S_{12} = 0.006$ F  
$S_{13} = 0.006$ F  
$S_{14} = 0.267$ F (least $m$)  
$S_{14} = 0.955$ F (middle $m$)  
$S_{14} = 3.095$ F (greatest $m$)  
$S_{15} = 6.222$ F (least $m$)  
$S_{15} = 6.249$ F (middle $m$)  
$S_{15} = 4.551$ F (greatest $m$)  
$S_{16} = 1.321$ F  
$t_{10} = 0.834$ F  
$t_{11} = 0.222$ F  
$t_{12} = 0.111$ F  
$t_{13} = 0.205$ F  
$t_{14} = 0.139$ F  
$t_{15} = 0.044$ F (double concave element only)  
$t_{16} = 0.139$ F  
$t_{17} = 0.111$ F  
$t_{18} = 0.122$ F  
$R_{20} = $ Plano  
$R_{21} = $ Plano  
$-R_{22} = 12.046$ F  
$-R_{23} = 0.965$ F  
$-R_{24} = 5.557$ F  
$R_{25} = 1.182$ F  
$-R_{26} = 1.182$ F  
$R_{27} = 1.273$ F  
$R_{28} = $ Plano  
$-R_{29} = 1.118$ F  
$R_{30} = 1.118$ F  
$R_{31} = 1.981$ F  
$R_{32} = 1.448$ F  
$R_{33} = $ Plano  
$R_{34} = 0.414$ F  
$R_{35} = $ Plano With respect to the use of the minus (—) sign in connection with the R values, said sign is used with those surfaces whose center of curvature lies on the entrant side of their vertices.

Further, with respect to the refractive index $n_D$ and the Abbe number $\nu$ of the successive optical parts which are designated I–VII, these values should be respectively as specified in the table of mathematical expressions given herebelow.

$1.515 < n_D(I) < 1.750$         $57.0 < \nu(I) < 62.0$  
$1.509 < n_D(II) < 1.524$        $61.0 < \nu(II) < 68.0$  
$1.711 < n_D(III\ neg.) < 1.729$ $28.0 < \nu(III\ neg.) < 31.0$  
$1.509 < n_D(III\ pos.) < 1.524$ $61.0 < \nu(III\ pos.) < 68.0$  
$1.509 < n_D(IV) < 1.524$        $61.0 < \nu(IV) < 68.0$  
$1.515 < n_D(V\ neg.) < 1.531$   $57.0 < \nu(V\ neg.) < 62.0$  
$1.711 < n_D(V\ pos.) < 1.729$   $28.0 < \nu(V\ pos.) < 31.0$  
$1.711 < n_D(VI) < 1.729$        $28.0 < \nu(VI) < 31.0$  
$1.509 < n_D(VII) < 1.524$       $61.0 < \nu(VII) < 68.0$ As determined for the form of the invention shown in FIG. 5, the specific values of refractive index $n_D$ and Abbe number $\nu$ for the successive optical parts I–VII should be as stated in the table of mathematical expressions given herebelow.

$n_D(I) = 1.524$           $\nu(I) = 59.5$  
$n_D(II) = 1.517$          $\nu(II) = 64.5$  
$n_D(III\ neg.) = 1.720$   $\nu(III\ neg.) = 29.3$  
$n_D(III\ pos.) = 1.517$   $\nu(III\ pos.) = 64.5$  
$n_D(IV) = 1.517$          $\nu(IV) = 64.5$  
$n_D(V\ neg.) = 1.524$     $\nu(V\ neg.) = 59.5$  
$n_D(V\ pos.) = 1.720$     $\nu(V\ pos.) = 29.3$  
$n_D(VI) = 1.720$          $\nu(VI) = 29.3$  
$n_D(VII) = 1.517$         $\nu(VII) = 64.5$ Numerically speaking, the aforesaid values for the radii $R_{20}$–$R_{35}$, the axial thicknesses $t_{10}$–$t_{18}$, the axial spaces $S_{10}$–$S_{16}$, as well as the refractive index $n_D$ and Abbe number $\nu$ for the optical system 20 are given in the chart herebelow, wherein $m$ designates the magnification of said image and the specific values pertain only to that form of the invention shown in FIG. 5.

ZOOM RANGE OF MAGNIFICATION=4.0

| Optical Part | Radii | Thicknesses | Spaces | $n_D$ | $\nu$ |
|---|---|---|---|---|---|
| I | $R_{20}$=Plano<br>$R_{21}$=Plano | $t_{10}$=15.00 | $S_{10}$=27.53 least $m$<br>$S_{10}$=14.64 middle $m$<br>$S_{10}$=6.88 greatest $m$ | 1.524 | 59.5 |
| II | $-R_{22}$=216.77<br>$-R_{23}$=17.378 | $t_{11}$=4.00 | $S_{11}$=0.80 | 1.517 | 64.5 |
| III | $-R_{24}$=100.00<br>$R_{25}$=21.281<br>$-R_{26}$=21.281 | $t_{12}$=2.00<br>$t_{13}$=3.70 | $S_{12}$=0.10 | 1.720<br>1.517 | 29.3<br>64.5 |
| IV | $R_{27}$=22.909<br>$R_{28}$=Plano | $t_{14}$=2.50 | $S_{13}$=0.10 | 1.517 | 64.5 |
| V | $-R_{29}$=20.137<br>$R_{30}$=20.137<br>$R_{31}$=35.645 | $t_{15}$=0.80<br>$t_{16}$=2.50 | $S_{14}$=4.78 least $m$<br>$S_{14}$=17.23 middle $m$<br>$S_{14}$=55.70 greatest $m$ | 1.524<br>1.720 | 59.5<br>29.3 |
| VI | $R_{32}$=26.062<br>$R_{33}$=Plano | $t_{17}$=2.00 | $S_{15}$=111.97 least $m$<br>$S_{15}$=112.46 middle $m$<br>$S_{15}$=81.90 greatest $m$ | 1.720 | 29.3 |
| VII | $R_{34}$=7.4473<br>$R_{35}$=Plano | $t_{18}$=2.20 | $S_{16}$=23.78 | 1.517 | 64.5 |

All scalar values are given in millimeters.

Although only two forms of the present invention have been shown and described in detail, it will be understood that other forms are possible and changes may be made in the form and arrangement of the parts and in the constructional data thereof within the generic values above mentioned without departing from the spirit of the invention as defined in the claims here appended.

I claim:
1. In a microscope,
a zoom type of pancratic optical system comprising,
an objective formed from a positive lens group and a negative lens group in optical alignment therewith, said groups being movable axially simultaneously and continuously at different rates with respect to a stationary point on their optical axis such that a substantially stationary image is formed of a specimen by the system through a continuous progression of magnification including a magnification range of substantially 4, and
an eyepiece aligned with said objective and focused on said stationary image for viewing the same,
said positive lens group comprising a front block of transparent optical material spaced rearwardly from said specimen and designated I,
an aperture plate mounted on the front face of said block, the aperture therein being aligned optically with said group for varying the numerical aperture of the object side of said system substantially in proportion to the change of magnification of the system while maintaining the numerical aperture on the image side substantially constant,
a first and a second positive singlet lens comprised in said positive group and spaced rearwardly from said block and from each other and designated II and IV respectively, the lens surfaces thereof having the stronger curvature facing toward each other,
a positive doublet lens designated III comprised in said positive group and interposed between said singlet lenses and spaced axially from each, said doublet lens comprising a front negative lens element and a rear double convex lens element in contact therewith,
said negative lens group being of double concave form and being designated V,
the focal lengths $F_I$ to $F_{IV}$ and $-F'$ of the successive optical parts I to V respectively having numerical values in terms of F as set forth in the table of mathematical expressions herebelow,

$F_I = \infty$  $F_{IV} = 2.462$ F
$F_{II} = 2.017$ F  $-F' = 1.498$ F
$F_{III} = 6.406$ F where F represents the equivalent focal length of said positive lens group, $S_{10}$=1.530 F (least $m$)  $S_{14}$=3.095 F
$S_{10}$=0.814 F  (greatest $m$)
 (middle $m$)  $t_{10}$=0.834 F
$S_{10}$=0.382 F  $t_{11}$=.222 F
 (greatest $m$)  $t_{12}$=.111 F
$S_{11}$=0.044 F  $t_{13}$=.205 F
$S_{12}$=0.006 F  $t_{14}$=.139 F
$S_{13}$=0.006 F  $t_{15}$=.044 F
$S_{14}$=.267 F (least $m$)  (double concave
$S_{14}$=.955 F  element only)
 (middle $m$)  $t_{16}$=0.139 F wherein $S_{10}$ to $S_{14}$ represent the air spaces between the successive optical parts I to V, $m$ represents the magnification of the object, and $t_{10}$ to $t_{16}$ represent the axial thicknesses of the successive optical parts.

2. In a microscope, a zoom type of pancratic optical system comprising, an objective formed from a positive lens group and a negative lens group in optical alignment with each other, said groups being axially movable simultaneously at different rates along a common axis so as to vary the magnification of the image of an object formed thereby, said positive lens group including a front block of transparent optical material spaced at a variable working distance $S_{10}$ from said object and designated I, an aperture plate mounted on the front face of said block, the aperture therein being aligned optically with said group for varying the numerical aperture of the object side of said system substantially in proportion to the magnification of the system while maintaining the numerical aperture on the image side substantially constant, two singlet positive lenses spaced from each other and from said block, said lenses being designated II and IV, a positive doublet lens designated III which is spaced from and between lenses II and IV, said doublet lens being composed of a front double concave lens element and a rear double convex lens element, said negative lens group being of double concave form and being designated V, said group being composed of a front double concave lens element in contact with a positive meniscus rear lens element, the values for the optical parameters of said objective being given partially in terms of F in the table of mathematical statements herebelow wherein $R_{20}$ to $R_{31}$ represent the radii of the refractive surfaces of the successive optical parts I to V, the minus ($-$) sign used therewith meaning that the centers of curvature of such refractive surfaces are located on the entrant side of the vertices of said surfaces, $t_{10}$ to $t_{16}$ represent the axial thicknesses of said successive optical parts, $S_{10}$ to $S_{15}$ represent the successive axial air spaces between said groups, $n_D$ and $\nu$ represent respectively the refractive index and Abbe number of the glasses in said optical elements and groups, and $m$ signifies the magnification of said image and F represents the equivalent focal length of said positive lens group, $R_{20}$=Plano
$R_{21}$=Plano
$-R_{22}$=12.046 F
$-R_{23}$=0.965 F
$-R_{24}$=5.557 F
$R_{25}$=1.182 F
$-R_{26}$=1.182 F
$R_{27}$=1.273 F
$R_{28}$=Plano
$-R_{29}$=1.118 F
$R_{30}$=1.118 F
$R_{31}$=1.981 F
$S_{10}$=1.530 F (least $m$)
$S_{10}$=0.814 F (middle $m$)
$S_{10}$=0.382 F (greatest $m$)
$S_{11}$=.044 F
$S_{12}$=0.006 F
$S_{13}$=0.006 F
$S_{14}$=0.267 F (least $m$)
$S_{14}$=0.955 F (middle $m$)
$S_{14}$=3.095 F (greatest $m$)
$S_{15}$=6.222 F (least $m$)
$S_{15}$=6.249 F (middle $m$)
$S_{15}$=4.551 F (greatest $m$)
$t_{10}$=0.834 F
$t_{11}$=0.222 F
$t_{12}$=0.111 F
$t_{13}$=0.205 F
$t_{14}$=0.139 F
$t_{15}$=0.044 F
$t_{16}$=0.139 F
$n_D$(I)=1.524
$n_D$(II)=1.517
$n_D$(III neg.)=1.720
$n_D$(III pos.)=1.517
$n_D$(IV)=1.517
$n_D$(V neg.)=1.524
$n_D$(V pos.)=1.720
$\nu$(I)=59.5
$\nu$(II)=64.5
$\nu$(III neg.)=29.3
$\nu$(III pos.)=64.5
$\nu$(IV)=64.5
$\nu$(V neg.)=59.5
$\nu$(V pos.)=29.3

3. In a microscope, a zoom type of pancratic optical system comprising, an objective formed from a positive lens group and a negative lens group in optical alignment with each other, said members being axially movable simultaneously at different rates along a common axis so as to vary the magnification of the image of an object formed thereby, said positive lens group including a front block of transparent optical material spaced at a variable working distance $S_{10}$ from said object and designated I, two singlet positive lenses spaced from each other and from said block, said lenses being designated II and IV, a positive doublet lens designated III which is spaced from and between lenses II and IV, said doublet lens being composed of a front double concave lens element and a rear double convex lens element, said negative lens group being designated V and being composed of a front double concave lens element in contact with a double convex rear lens element, the values for the optical parameters of said objective being given partially in terms of F in the table of mathematical statements herebelow wherein $R_{20}$ to $R_{31}$ represent the radii of the refractive surfaces of the successive optical parts I to V, the minus ($-$) sign used therewith meaning that the centers of curvature of such refractive surfaces are located on the entrant side of the vertices of said surfaces, $t_{10}$ to $t_{16}$ represent the axial thicknesses of said successive optical parts, $S_{10}$ to $S_{15}$ represent the successive axial air spaces between said groups, $n_D$ and $\nu$ represent respectively the refractive index and Abbe number of the glasses in said optical elements and groups, and $m$ signifies the magnification of said image and F represents the equivalent focal length of said positive lens group, $R_{20}$=Plano
$R_{21}$=Plano
$-R_{22}$=12.046 F
$-R_{23}$=0.965 F
$-R_{24}$=5.557 F
$R_{25}$=1.182 F
$-R_{26}$=1.182 F
$R_{27}$=1.273 F
$R_{28}$=Plano
$-R_{29}$=1.118 F
$R_{30}$=1.118 F
$R_{31}$=1.981 F
$S_{10}$=1.530 F (least $m$)
$S_{10}$=0.814 F (middle $m$)
$S_{10}$=0.382 F (greatest $m$)
$S_{11}$=0.044 F
$S_{12}$=0.006 F
$S_{13}$=0.006 F
$S_{14}$=0.267 F (least $m$)
$S_{14}$=0.955 F (middle $m$)
$S_{14}$=3.095 F (greatest $m$)
$S_{15}$=6.222 F (least $m$)
$S_{15}$=6.249 F (middle $m$)
$S_{15}$=4.551 F (greatest $m$)
$t_{10}$=0.834 F
$t_{11}$=0.222 F
$t_{12}$=0.111 F
$t_{13}$=0.205 F
$t_{14}$=0.139 F
$t_{15}$=0.044 F
$t_{16}$=0.139 F
$n_D$(I)=1.524
$n_D$(II)=1.517
$n_D$(III neg.)=1.720
$n_D$(III pos.)=1.517
$n_D$(IV)=1.517
$n_D$(V neg.)=1.524
$n_D$(V pos.)=1.720
$\nu$(I)=59.5
$\nu$(II)=64.5
$\nu$(III neg.)=29.3
$\nu$(III pos.)=64.5
$\nu$(IV)=64.5
$\nu$(V neg.)=59.5
$\nu$(V pos.)=29.3 said optical system further having an aperture plate located against the entrant surface of said block I, and a circular wall forming an aperture in said plate coaxially with said system, the diameter of said aperture being substantially .197 F whereby the numerical aperture on the object side of said optical system varies between substantially .0625 and .2500 in direct proportion to changes in magnification of said image while the numerical aperture on the image side remains substantially constant.

4. In a microscope, a zoom type of pancratic optical system comprising,
an objective formed from a positive lens group and a double concave lens group in optical alignment therewith, said members being movable axially simultaneously and continuously at different rates with respect to a stationary point on their axis of alignment so as to form a stationary image of an object at continuously variable magnification, and
an eyepiece optically aligned with said image and focused thereon for viewing the image,
the focal length of said negative lens group being numerically substantially—1.497 F times the focal length of the positive lens group,
said positive lens group comprising a front block of transparent optical material spaced rearwardly from said object and designated I,
an aperture plate mounted on the front face of said block, the aperture therein being aligned with said positive group and having a diameter of substantially .197 F where F represents the equivalent focal length of said group, the plate serving to vary the numerical aperture of said system on the object side substantially in proportion to magnification of said image while maintaining the numerical aperture on the image side substantially constant,
two singlet positive lenses spaced from each other and having their surfaces of strongest curvature facing each other, said lenses being designated II and IV respectively and being successively spaced rearwardly of said block,
a positive doublet lens designated III interposed between lenses II and IV in spaced relation and composed of a front double concave lens element which lies in contact on its rear surface with a double convex lens element,
said double concave lens group being designated V and being composed of a front double concave lens element which lies in contact on its rear side with a positive meniscus lens element, said eyepiece comprising a pair of plano convex lenses which are designated VI and VII and have their plane surfaces facing rearwardly and further comprising a diaphragm located at a distance of substantially 0.521 F rearwardly of lens VI at an image plane and having an aperture diameter designated $d_1$ which has a value $d_1=.472$ F,
the values for the constructional data for said optical system being given in terms of F in the table of mathematical statements herebelow wherein $R_{20}$ to $R_{35}$ represent the radii of the successive optical surfaces of the optical parts I to VII and the minus (—) sign used therewith applies to those surfaces which have their centers of curvature located on the entrant side of the vertices of such surfaces, $t_{10}$ to $t_{18}$ represent the axial thicknesses of said successive optical parts I to VII, and $S_{10}$ to $S_{16}$ represent the successive air spaces between said optical parts, and F designates the equivalent focal length of said positive lens group,

| | |
|---|---|
| $R_{20}$=Plano | $S_{11}$=0.044 F |
| $R_{21}$=Plano | $S_{12}$=0.006 F |
| —$R_{22}$=12.046 F | $S_{13}$=0.006 F |
| —$R_{23}$=0.965 F | $S_{14}$=0.267 F (least $m$) |
| —$R_{24}$=5.557 F | $S_{14}$=0.955 F (middle $m$) |
| $R_{25}$=1.182 F | $S_{14}$=3.095 F (greatest $m$) |
| —$R_{26}$=1.182 F | $S_{15}$=6.222 F (least $m$) |
| $R_{27}$=1.273 F | $S_{15}$=6.249 F (middle $m$) |
| $R_{28}$=Plano | $S_{15}$=4.51 F (greatest $m$) |
| —$R_{29}$=1.118 F | $S_{16}$=1.321 F |
| $R_{30}$=1.118 F | $t_{10}$=0.834 F |
| $R_{31}$=1.981 F | $t_{11}$=0.222 F |
| $R_{32}$=1.448 F | $t_{12}$=0.111 F |
| $R_{33}$=Plano | $t_{13}$=0.205 F |
| $R_{34}$=0.414 F | $t_{14}$=0.139 F |
| $R_{35}$=Plano | $t_{15}$=0.044 F |
| $S_{10}$=1.530 F (least $m$) | $t_{16}$=0.139 F |
| $S_{10}$=0.814 F (middle $m$) | $t_{18}$=0.122 F |
| $S_{10}$=0.382 F (greatest $m$) | $t_{17}$=0.111 F | wherein $m$ represents the magnification of said objective.

5. A zoom type of pancratic optical system for a microscope comprising
an objective formed from a positive lens group and a negative lens group in optical alignment therewith, said members being simultaneously movable axially in such a manner as to form a stationary image of an object at continuously variable magnifications,
said positive lens group comprising a foremost block of transparent optical material spaced from said object and designated I,
an aperture plate mounted on the front face of said block, the aperture therein being aligned with said positive group and having a diameter of substantially .197 F where F represents the focal length of said group, the plate serving to vary the numerical aperture of said system on the object side subtsantially in proportion to magnification of said image while maintaining the numerical aperture on the image side substantially constant,
two singlet positive lenses designated II and IV spaced from each other and spaced from said block,
a positive doublet lens designated III which is spaced from and between both said singlet lenses, and composed of a double concave lens element followed by a double convex element,
said negative lens group being designated V and being composed of a double concave lens element followed by a positive meniscus lens element,
an eyepiece comprising front and rear plano-convex lenses which are designated VI and VII respectively and are spaced apart at an axial distance $S_{16}$,
the constructional data for one form of the above-described optical parts I to V being given numerically in the chart herebelow wherein $R_{20}$ to $R_{35}$ designate the radii of the successive optical surfaces and the minus (—) sign used therewith applies to those surfaces which have their centers of curvature located on the entrant side of their vertices, $t_{10}$ to $t_{18}$ represent the axial thicknesses of said successive optical parts, and $S_{10}$ to $S_{16}$ represent the successive axial spaces between said parts, and $m$ denotes magnification,

ZOOM RANGE OF MAGNIFICATION=4.0

| Optical Part | Radii | Thicknesses | Spaces | $n_D$ | $\nu$ |
|---|---|---|---|---|---|
| I | $R_{20}$=Plano<br>$R_{21}$=Plano | $t_{10}$=15.00 | $S_{10}$=27.53 least $m$<br>$S_{10}$=14.64 middle $m$<br>$S_{10}$=6.88 greatest $m$ | 1.524 | 59.5 |
| II | $-R_{22}$=216.77<br>$-R_{23}$=17.378 | $t_{11}$=4.00 | $S_{11}$=0.80 | 1.517 | 64.5 |
| III | $-R_{24}$=100.00<br>$R_{25}$=21.281<br>$-R_{26}$=21.281 | $t_{12}$=2.00<br>$t_{13}$=3.70 | $S_{12}$=0.10 | 1.720<br>1.517 | 29.3<br>64.5 |
| IV | $R_{27}$=22.909<br>$R_{28}$=Plano | $t_{14}$=2.50 | $S_{13}$=0.10 | 1.517 | 64.5 |
| V | $-R_{29}$=20.137<br>$R_{30}$=20.137<br>$R_{31}$=35.645 | $t_{15}$=0.80<br>$t_{16}$=2.50 | $S_{14}$=4.78 least $m$<br>$S_{14}$=17.23 middle $m$<br>$S_{14}$=55.70 greatest $m$ | 1.524<br>1.720 | 59.5<br>29.3 |
| VI | $R_{32}$=26.062<br>$R_{33}$=Plano | $t_{17}$=2.00 | $S_{15}$=111.97 least $m$<br>$S_{15}$=112.46 middle $m$<br>$S_{15}$=81.90 greatest $m$ | 1.720 | 29.3 |
| VII | $R_{34}$=7.4473<br>$R_{35}$=Plano | $t_{18}$=2.20 | $S_{16}$=23.78 | 1.517 | 64.5 |

All scalar quantities being given in millimeters.

6. A zoom lens system for a microscope comprising a movable positive front lens group having an equivalent focal length designated by F and spaced away from a specimen surface at a variable axial distance $S_1$, said group being composed of a front compound lens member having a front double concave lens element designated A which lies in surface contact with a rear double convex lens element designated B, said member having an equivalent focal length of substantially F (AB)=2.858, and said group further being composed of a rear positive lens member designated C which is spaced from element B at a fixed axial distance $S_2$ and has an equivalent focal length of substantially F(C)=1.609 F, said front lens group further being composed of an aperture diaphragm spaced forwardly from lens member AB at an axial distance between .585 F and .715 F and having a diameter of .104 F, a movable negative rear lens member D which is spaced at a variable axial distance $S_3$ from said front group, the equivalent focal length thereof being designated —F' and having a value of substantially 1.497 F, member D being spaced at a variable axial distance $S_4$ from the next lens, and an eyepiece which comprises a front and a rear planoconvex lens designated respectively E and F which are spaced axially apart by an axial distance $S_5$, the values in terms of F of the successive airspaces $S_1$, $S_3$ and $S_4$ being given substantially in the tables herebelow for two terminal positions of the movable lenses.

For least magnification:
$S_1$=2.214 F
$S_3$=0.437 F
$S_4$=5.847 F

For highest magnification:
$S_1$=1.067 F
$S_3$=3.267 F
$S_4$=4.165 F the values for the successive lens radii $R_1$ to $R_{11}$, the axial lens thicknesses $t_1$ to $t_6$ of the successive lens elements and the axial airspaces $S_2$ and final airspace $S_5$ being given in terms of F in the table herebelow wherein the minus (—) sign used with the R values means that such a surface is concave toward the front of said system.

$-R_1$=2.611 F
$R_2$=1.059 F
$-R_3$=0.668 F
$R_4$=1.161 F
$-R_5$=2.811 F
$-R_6$=0.774 F
$R_7$=Plano
$R_8$=1.909 F
$R_9$=Plano
$R_{10}$=0.818 F
$R_{11}$=Plano
$t_1$=.0945 F
$t_2$=.1445 F
$t_3$=.1445 F
$t_4$=.0556 F
$t_5$=.2223 F
$t_6$=.1834 F
$S_2$=.0111 F
$S_5$=2.247 F 7. A zoom lens system for a microscope comprising a movable positive front lens group which is spaced from a specimen surface at a variable axial distance designated $S_1$, said group being composed of a front compound lens element A and a rear double convex lens element B contacting each other along an interface, said group further being composed of a rear positive lens member C which is spaced from element B at a fixed axial distance $S_2$, a movable negative rear lens member D which is spaced at a variable axial distance $S_3$ from said front group, member D being spaced at a variable axial distance $S_4$ from a stationary eyepiece, which is comprised of a front and a rear plano-convex lens which are designated E and F respectively and are separated from each other by an axial distance designated $S_5$, the numerical values of the successive lens radii $R_1$ to $R_{11}$ on the lens elements A, B, C, D, E and F being given in the table herebelow wherein the minus (—) sign used with certain R values means that such a surface is concave toward the front of the system, $t_1$ to $t_6$ represent the axial thicknesses of the successive lens elements A to D, $S_1$ to $S_5$ are the axial spaces given for two terminal positions of the movable members of the zoom system, and $n_D$ and $v$ represent respectively the refractive index and Abbe number of the optical materials used in said elements, all scalar values being given in millimeters,

MAGNIFICATION RANGE=4:1

| Lens | Radii | Thicknesses | Air Spaces | $n_D$ | $v$ |
|---|---|---|---|---|---|
| A | $-R_1 = 46.989$ | $t_1 = 1.7$ | $S_1 = \begin{cases} 39.840 \text{ low } m \\ 19.194 \text{ high } m \end{cases}$ | 1.720 | 29.3 |
| B | $R_2 = 19.055$ $-R_3 = 12.023$ | $t_2 = 2.6$ | | 1.517 | 64.5 |
| | | | $S_2 = 0.20$ | | |
| C | $R_4 = 20.893$ $-R_5 = 50.582$ | $t_3 = 2.6$ | | 1.517 | 64.5 |
| | | | $S_3 = \begin{cases} 7.873 \text{ low } m \\ 58.795 \text{ high } m \end{cases}$ | | |
| D | $-R_6 = 13.932$ $R_7 = \text{Plano}$ | $t_4 = 1.0$ | | 1.517 | 64.5 |
| | | | $S_4 = \begin{cases} 106.810 \text{ low } m \\ 76.535 \text{ high } m \end{cases}$ | | |
| E | $R_8 = 34.356$ $R_9 = \text{Plano}$ | $t_5 = 4.0$ | | 1.720 | 29.3 |
| | | | $S_5 = 40.432$ | | |
| F | $R_{10} = 14.723$ $R_{11} = \text{Plano}$ | $t_6 = 3.3$ | | 1.517 | 64.5 | wherein $m$ denotes magnification and all scalar values are given in millimeters.

References Cited
UNITED STATES PATENTS 2,699,700    1/1955    Klemt _____ 88—1.5
3,170,984    2/1965    Rosenberger et al. __ 350—184

JEWELL H. PEDERSEN, *Primary Examiner.*

JOHN K. CORBIN, *Examiner.*

UNITED STATES PATENT OFFICE

CERTIFICATE OF CORRECTION

Patent No. 3,353,891                                November 21, 1967

Harold E. Rosenberger

It is certified that error appears in the above identified patent and that said Letters Patent are hereby corrected as shown below:

Column 16, in the table, second column, line 9 thereof, "$S_{15}=4.51F$" should read -- $S_{15}=4.551F$ --.

Signed and sealed this 14th day of October 1969.

(SEAL)
Attest:

Edward M. Fletcher, Jr.                          WILLIAM E. SCHUYLER, JR.
Attesting Officer                                      Commissioner of Patents